United States Patent Office 2,695,307
Patented Nov. 23, 1954

2,695,307
PROCESS OF MANUFACTURING POLYMERIZED ORGANIC SILICON COMPOUNDS

Clement Joseph Guillissen, Uccle, Brussels, and Abram Gancberg, Woluwe-St.-Pierre, Brussels, Belgium, assignors to Union Chimique Belge, S. A., Brussels, Belgium, a corporation of Belgium No Drawing. Application September 13, 1948, Serial No. 49,124

Claims priority, application Belgium September 20, 1947

11 Claims. (Cl. 260—448.2)

This invention relates to a new process for the manufacture of polymerized organic silicon compounds. More particularly, it deals with a method of manufacturing polymers of organo-siloxanes in which at least two silicon atoms in each polymer molecule are connected by an oxygen atom.

Previously, such compounds have been formed by the hydrolysis of halo, hydroxy, alkyl-oxy, aryl-oxy, or alicyclic-oxy silicon compounds or silanes, as monomers or partial polymers, to form the corresponding silanol monomers or partial polymers, and then condensing these silanols to eliminate water and to produce the desired polymers in which the silicon atoms are bridged by oxygen atoms. The yields of such methods, however, have been comparatively low, and the degree of polymerization has been hard to control and far from uniform.

It is an object to this invention to produce polymers of organo-siloxanes in a new, simple, efficient, effective and economic manner, the resulting products from which are more uniform and may be more easily predicted.

Another object is to produce such polymers by a process which is easier to control, has less losses, produces better yields, and forms by-products which may be reused in the process.

Another object is to develop a process for forming substantially automatically such polymers in which the resulting product contains more molecules of the same size and less molecules which are over and under polymerized than by previous processes.

In accordance with this invention, the process for producing the polymerized organic silicon compounds comprises reacting in an anhydrous medium, an organo-halo-silane with an organo-oxy-silane to liberate an organic halide and gradually to polymerize the resulting product, which reaction does not involve hydrolysis or the liberation of water. An example of this reaction wherein only one halogen atom reacts with one hydroxy, alkyl-oxy, aryl-oxy or alicyclic-oxy radical may be represented by the following equation:

$$R_3SiX + R'_3SiOR'' \rightarrow R_3Si-O-SiR'_3 + R''X$$

wherein R, R' and R'' are hydrocarbon radicals having from one to ten carbon atoms, and R'' may also be a hydrogen atom, and X is a halogen atom. These hydrocarbon radicals may be alkyl, aryl, and/or alicyclic radicals and may be the same or different in the same or different molecules. However, the two different silanes which are reacted with each other may each have more than just one —X or one —OR'' radical as shown in the above equation. Each silane may have one, two, or three such radicals connected to their silicon atoms, and one, two, or all thereof may enter into the reaction and form bonds between two silicon atoms. Thus, at least one halogen atom of one silane is reacted with at least one hydroxy, alkyl-oxy, aryl-oxy, or alicyclic-oxy radical of the other silane to produce at least one oxygen bridged silicon polymer and one molecule of a hydrogen or organic halide.

The organo-halo silane used as one of the starting materials in the reaction must be free from water, i. e. anhydrous, and may be prepared by reacting a silicon tetrahalide with a Grignard reagent, i. e. an organic magnesium halide, preferably in the presence of a solvent.

The other starting material, hydroxy, alkyl-oxy, aryl-oxy, or alicyclic-oxy silane, used in the reaction, must also be free from water, i. e. anhydrous, and may be prepared from part of the organo-halo-silane produced for the first starting material or another supply thereof, by condensing it with an alcohol such as for example methyl, ethyl, etc. alcohols or mixture thereof; or by reacting an organic orthosilicate with a Grignard reagent.

If such methods are used for producing the starting materials then the by-product hydrocarbonhalide formed in the process of this invention may be reused to produce the Grignard reagents.

The reaction of these two organic silanes is preferably executed at an elevated temperature and at atmospheric pressure, however, a reduced or increased pressure may be employed without departing from the scope of this invention. It is advantageous to carry out the reaction in the presence of an anhydrous inert solvent, such as for example benzene, toluene, xylenes, or the like, to better control the reaction and maintain the resulting polymer from increasing the viscosity of the reaction mixture to an undesirable degree. Also, the reaction may be improved by the addition of an anhydrous metallic halide catalyst, preferably soluble in water, the metal of which is selected from groups II through VIII and periods 1 through 4, and preferably periods 2 and 3, of the periodic table of the elements, such as for example, iron, aluminum, calcium, zinc, etc. Of these metal halides, it has been found that the chlorides are preferred and that aluminum chloride in particular produces an excellent quality polymer at a relatively low temperature which may be easily controlled. Thus, the actual conditions as to temperature and pressure depend upon the type and activity of the catalyst employed.

The reaction is preferably carried out by first mixing the two silanes in the presence of a solvent and a catalyst and then gradually raising the temperature of the mixture until all of the molecules have reacted, that is, until no more halo-silane remains in the solution and all of the hydrocarbon halides formed in the reaction have been distilled off. Continued heating and refluxing increases the degree of polymerization of the product. After the desired polymer is obtained, the mixture may be diluted again with an inert water immiscible solvent and washed with water to remove the catalyst, and then the additional solvent may be removed by distillation.

The unexpected result of this reaction is that the organic silanes formed, also automatically polymerize to form oily substances which have low vapor pressures. These substances are valuable as industrial products, such as for example, in coating and varnish compositions and as fluids for vacuum pumps and hydraulic brake systems.

The above mentioned and other features and objects of this invention and the manner of attaining them will become more apparent and the invention itself will be best understood by reference to the following specific examples of the process:

Example I

In a two liter flask provided with continuous agitation and a reflux column, 170 gr. of silicon tetrachloride and one liter of anhydrous toluene solvent were mixed and cooled in ice to about 0° C. To this cold mixture a Grignard reagent was added drop by drop, comprising 335 cc. of a 2.15 N solution of ethyl magnesium chloride and 249 cc. of a 2.35 N solution of phenyl magnesium chloride. After the addition of the Grignard reagent, the resulting mixture was slowly heated and refluxed for one hour to produce an organo-halo-silane, one of the two starting materials of the process of this example. This mixture was then filtered to remove the precipitated magnesium salts from the Grignard reagent.

This resulting organo-chloro-silane was divided into two equal parts. One part was placed in a two liter flask to which 53.7 gr. of anhydrous methyl alcohol was gradually added, and the resulting mixture was refluxed while being continuously agitated until no more hydrogen chloride was liberated, thereby producing an organo-oxy-silane, the other of the two starting compounds of the process of this example.

Then these two silane starting materials were mixed together in a flask with 25 gr. of pulverized anhydrous zinc chloride catalyst, and refluxed at a temperature between about 80° and 90° C. for two to three hours. Then the mixture was distilled to remove the solvent present therein, after which the temperature was gradually increased to about 220° to 240° C. and maintained within this range until no more organic chloride was present in the mixture, indicating that all of the organo-chloro-silane had reacted with the organo-oxy-silane originally present in the mixture. The by-product in this case was methyl chloride which is normally gaseous and therefore was continuously driven off of the mixture as it was formed leaving only the desired polymer and catalyst in the flask.

Since this reaction also automatically polymerizes the resulting product, 100 cc. of toluene was added to the resulting polymer to reduce its viscosity before the metallic chloride catalyst present therein was removed by successive washings with water. This washing operation did not cause hydrolysis of the silicon compounds present because all of the hydrolyzable silicon compounds in the mixture had already been reacted. The additional solvent was then removed, such as by distillation, and a resulting pure polymer of oily consistency was obtained which was found to be valuable in varnish compositions.

*Example II*

Similar to Example I, 170 gr. of silicon tetrachloride were reacted with 550 cc. of a Grignard reagent comprising a 3.27 N solution of methyl magnesium chloride, to produce an organo-halo-silane, one of the starting materials for the process of this example, and then filtered to remove the precipitated magnesium salts.

This resulting organo-chloro-silane was divided into two equal parts; one part of which was reacted with 50 gr. of anhydrous ethyl alcohol and refluxed until no more hydrogen chloride was liberated, thereby producing an organo-oxy-silane, the other of the two starting materials of the process of this example.

These two starting materials were then mixed together with 25 gr. of ferric chloride catalyst and refluxed as in Example I, first at a low temperature for two or three hours, then slowly increasing and maintaining the temperature at about 170° C. until no more organic chloride was present in the mixture. The resulting polymer was then purified in a similar manner to that described in Example I, and was found, after elimination of the most volatile substances by vacuum distillation, to be a viscous oily substance having a very low vapor pressure and suitable for use as a fluid in vacuum pumps or hydraulic brake systems.

*Example III*

170 gr. of silicon tetrachloride and one liter of anhydrous toluene were mixed and cooled to about 0° C. and then to this mixture a Grignard reagent was added drop by drop, comprising 325 cc. of a 2.35 N solution of phenyl magnesium chloride and 286 cc. of a 3.27 N solution of methyl magnesium chloride. The resulting mixture was then slowly heated and refluxed for about one hour to produce an organo-halo-silane, one of the starting materials for the process of this example, and then filtered to remove the precipitated magnesium salts.

The other starting material was prepared from 208.2 gr. of ethyl orthosilicate which was cooled to about 0° C. and then to it a Grignard reagent was added drop by drop, comprising 325 cc. of a 2.35 N solution of phenyl magnesium chloride and 286 cc. of a 3.27 N solution of methyl magnesium chloride, and the resulting mixture was filtered to remove the precipitated magnesium salts.

The resulting two starting materials were admixed with 75 gr. of anhydrous aluminum chloride catalyst and refluxed for two hours. Then the mixture was slowly distilled to remove the solvents and other volatile products therein, and then the temperature was gradually increased and maintained at a temperature between about 100° and 124° C. for about ten hours. After this time, the reaction was substantially complete in that the distillate collected showed no traces of silicon compounds, and the catalyst was removed from the mixture by washing it with water. The addition of this water did not make the solution acid which also indicated that the starting organic chloride material had all been reacted. After purification, 216 gr. of the desired polymerized organic silicon compound was obtained which was found to be particularly useful in varnish compositions.

The use of aluminum chloride as a catalyst in this example enabled the polymerization to take place at a lower temperature than that employed in the other two examples, and accordingly a better control of the reaction and an excellent quality polymer was obtained. A higher temperature may be employed, but then the control of the reaction becomes more difficult. The advantages obtained by operating at a lower temperature, as well as the quality of the desired product, make the use of aluminum chloride interesting even though the quantity of the by-product, i. e. organic halide, is less and the production of hydrogen halide is more than that obtained with other metallic halide catalysts.

While there is described above the principles of this invention in connection with specific examples, it is to be clearly understood that this description is made only by way of example and not as a limitation to the scope of this invention.

What is claimed is:

1. A process for producing a polymerized organic silicon compound comprising reacting in an anhydrous medium at an elevated temperature, an organo-halo-silane with an organo-oxy-silane to liberate an organic halide in the presence of a metal halide catalyst selected from the metals in groups II and III of periods 1–4 of the periodic table of the elements, and to polymerize the resulting product to form a viscous liquid polymer in which at least two silicon atoms are connected by an oxygen atom, said organo-halo-silane having the general formula $R_nSiX_m$ and said organo-oxy-silane having the general formula $R'_nSi(OR'')_m$, wherein R, R' and R'' are radicals selected from the group consisting of alkyl, aryl and alicyclic hydrocarbons of not more than ten carbon atoms and wherein R'' may also be a hydrogen atom, X is a halogen atom, and $m$ and $n$ are integers 1 to 3 and 3 to 1, respectively, the sum thereof being 4.

2. The process of claim 1 wherein said catalytic halide is chlorine.

3. The process of claim 1 wherein said catalyst is aluminum chloride.

4. The process of claim 1 wherein said catalyst is zinc chloride.

5. A process for producing a polymerized organic silicon compound comprising heating in an anhydrous medium a mixture of an organo-halo-silane and an organo-oxy-silane to liberate an organic halide in the presence of a metal halide catalyst selected from the metals in groups II and III of periods 1–4 of the periodic table of the elements, removing said liberated organic halide, further heating the resulting mixture to form a viscous liquid polymer in which at least two silicon atoms are connected by an oxygen atom, and isolating said polymer, said organo-halo-silane having the general formula $R_nSiX_m$ and said organo-oxy-silane having the general formula $R'_nSi(OR'')_m$, wherein R, R' and R'' are radicals selected from the group consisting of alkyl, aryl and alicyclic hydrocarbons of not more than ten carbon atoms and wherein R'' may also be a hydrogen atom, X is a halogen atom, and $m$ and $n$ are integers 1 to 3 and 3 to 1, respectively, the sum thereof being 4.

6. The process of claim 5 wherein said catalyst is water soluble and wherein said isolating step comprises removing said catalyst from said resulting mixture by water washing.

7. The process of claim 5 wherein said medium includes a water immiscible solvent.

8. A process according to claim 1 wherein said reaction is carried out in the presence of an organic solvent.

9. A process according to claim 1 wherein said metal halide catalyst is selected from periods 2 and 3 of the peroidic table of the elements.

10. The process of claim 8 wherein said solvent is selected from the group of low boiling water immiscible solvents consisting of benzene, toluene and xylenes.

11. A process for preparing polysiloxane which comprises reacting at an elevated temperature alkyl alkoxy-silanes with alkyl halosilanes in the presence of an aluminum halide, and recovering siloxane polymer from the reaction product.

References Cited in the file of this patent

UNITED STATES PATENTS

| Number    | Name   | Date          |
|-----------|--------|---------------|
| 2,450,594 | Hyde   | Oct. 5, 1948  |
| 2,474,704 | Thayer | June 28, 1949 |
| 2,485,928 | Servais| Oct. 25, 1949 |